Patented Mar. 20, 1928.

1,663,233

UNITED STATES PATENT OFFICE.

WILLIAM C. ARSEM, OF SCHENECTADY, NEW YORK, ASSIGNOR TO INDUSTRIAL TECHNICS CORPORATION, OF SCHENECTADY, NEW YORK, A CORPORATION OF NEW YORK.

PREPARATION OF LEVULOSE FROM PURIFIED DAHLIA JUICE.

No Drawing. Application filed January 31, 1927. Serial No. 165,043.

This invention relates to the production of levulose and more particularly to the production of levulose from the juices of dahlias and other similar plants yielding carbohydrates, such as Jerusalem artichoke, chicory, elecampane and burdock.

In a copending application, Serial No. 424,459, filed November 16, 1920, (now Patent No. 1,616,167, granted February 1, 1927) I have disclosed and claimed a process of extracting and purifying inulin in which the inulin-containing material such as dahlias are comminuted and the juice or liquor extracted to obtain inulin in a more or less soluble form or in the form of a colloid associated with or combined with impurities. As set forth in this application, the juice may be clarified by submitting it to the action of a mixture of calcium hydroxide and calcium chloride. The calcium hydroxide and calcium chloride are preferably added in the cold until the thoroughly stirred mixture is just alkaline to methyl red paper, and the mixture is then heated, preferably to about 75° C., or even less, until a large part of the impurities become coagulated and examination shows that filtration will be successful. In carrying out the process disclosed in the said application, the clarified liquor is further treated to obtain inulin. This clarified liquor contains inulin and other carbohydrates related to inulin and levulose. Such carbohydrates cannot be removed from the solution by crystallization in the same manner as inulin, but may be converted into levulose. I therefore propose to hydrolyze the juice immediately after the clarifying step and convert the inulin and other carbohydrates to levulose which may then be removed from the solution.

In a copending application, Serial No. 484,153, filed July 12, 1921, (now Patent No. 1,616,169, granted February 1, 1927) I have disclosed and claimed a process of hydrolyzing inulin in which a solution containing inulin is subjected to the action of an acid present in the solution in any selected concentration and the action continued until a sample of the solution at ordinary temperature produces a maximum negative value of rotation of polarized light, then decreases and then passes through a second maximum negative rotation value. The clarified liquor obtained from the dahlia and other plants and containing inulin and other related carbohydrates may be hydrolyzed in the manner set forth in the application referred to, to obtain a liquor containing levulose, some mineral salts and traces of organic substances which may impart an undesired flavor. This solution can be concentrated by evaporation under reduced pressure at a low temperature until it contains 90 per cent levulose and it may then be cooled and the levulose separated from the solution by crystallization. The crystallization of the levulose may be accomplished by seeding the cool solution with levulose crystals and agitating it until a certain quantity of the levulose has crystallized out. The mixture may be then centrifuged to separate the levulose crystals from the molasses and the latter may be again concentrated by evaporation and a second crop of levulose crystals obtained.

Instead of evaporating the raw dilute levulose syrup in the manner set forth above, it may be first treated for the removal of certain organic impurities. A large fraction of these impurities is of fermentable nature and can be removed by treatment with a suitable ferment. The syrup may be cooled to about 37° C. after hydrolysis and pepsin added to it in a sufficient quantity to cause fermentation of these impurities. The fermentation may be allowed to proceed until the protein impurities are broken down. Other ferments, such as trypsin, may be employed, also other agents such as enzymes, bacteria and moulds which will break down proteins and not attack levulose or related carbohydrates, as the case may be. The solution, thus freed from the impurities having a bitter or disagreeable taste, can be concentrated by evaporation to about 80 per cent or 85 per cent and used for all purposes for which a palatable, edible sweet syrup are applicable. The syrup may be also concentrated to 90 per cent or more and treated as previously described to obtain crystallin levulose. An object of the present invention is to obtain levulose from the juice of dahlias and similar plants by hydrolyzing the juice without separating the inulin and thus recover the levulose from the carbohydrates present in the juice which are not capable of being separated by crystallization in the same manner that inulin may be separated as described in my copending application, Serial No. 424,459.

In a typical embodiment of the invention, dahlia bulbs or other inulin-bearing plants are thoroughly washed with water in a suitable apparatus to remove adhering dirt and at the same time are agitated to dislodge by friction the loose outer layer of skin which comes off in small fragments and is easily washed away. The bulbs are then reduced to pulp by grinding, pressing, rolling or otherwise so as to release as much of the juice as possible and the juice is separated from the solid matter by a rough filtration. The residual pulp may be more completely extracted by soaking it in water and pressing.

This juice is then clarified by adding to it substantially equivalent quantities of calcium hydroxide and calcium chloride, the addition being carefully made in the cold until the thoroughly stirred solution is just alkaline to methyl red paper. The clarifying solution is preferably made by grinding calcium hydroxide in a solution of calcium chloride so as to make a smooth cream.

The mixture of the clarifying solution and juice is then heated, preferably to about 75° C., or even less, until a large part of the impurities become coagulated. The impurities thus coagulated settle out in a form easily removed by filtration. In some instances, the liquid will now have become faintly acid but in general it will be preferable to add a little more of the clarifying solution either during the heating operation, or after the mixture has been heated to make it slightly alkaline to methyl red paper.

After the clarifying treatment has been completed, the juice obtained contains inulin and other carbohydrates related to inulin and levulose. These other carbohydrates can not be removed by crystallization as inulin can, but may be hydrolyzed to form levulose. Instead of following the procedure outlined in my copending application, Serial No. 424,459, in which the clarified juice is further treated to obtain inulin, I hydrolyze the juice preferably in the manner disclosed in my application Serial No. 484,153. Various acids may be employed in hydrolyzing the clarified juice. Thus, tartaric acid may be used and it is added to the juice in sufficient quantity to make the solution .005 N, assuming that the tartaric acid functions as a mono-basic acid, only the first H ion being active. The acid is added to the clarified juice and hydrolysis of the mixture is effected by heating it for the length of time necessary to produce a maximum negative rotation of polarized light. It is satisfactory to use an amount of tartaric acid which in the presence of the salts contained in the impure solution, will produce the same degree of conversion of the carbohydrates in approximately the same time as is the case when solutions of pure inulin are hydrolyzed with approximately .005 normal tartaric acid.

The heating is preferably performed in an acid-proof vessel provided with an agitator and the juice is heated to a temperature of 100° C. with continuous stirring. As described in my copending application, Serial No. 484,153, the hydrolysis is continued until a first negative value of rotation has been reached, after which the negative value of rotation will decrease and pass through a second maximum. Hydrolysis is continued until the final maximum or highest negative value of rotation, corresponding very closely to the maximum theoretical rotation of the solution, is obtained.

The liquid now contains levulose, some mineral salts and traces of organic substances. It may be concentrated by evaporation under reduced pressure at a low temperature until it contains about 90 per cent levulose. The concentrated solution may then be cooled and seeded with levulose crystals and agitated until a certain quantity of levulose has crystallized out. The crystals may be separated from the molasses in a centrifuge and the latter concentrated as before to obtain a second crop of levulose crystals.

Certain organic impurities may be removed from the solution prior to the separation of the levulose syrup. A large fraction of these impurities is of a fermentable nature and can be removed by treatment with a suitable ferment. The solution may be cooled, after the hydrolysis of the carbohydrates, to about 37° C., and fermented. For this purpose, pepsin, trypsin, or other ferments may be added to the solution and fermentation permitted to continue until the protein impurities are broken down. The sugar solution, thus freed from impurities having a bitter or disagreeable taste, can be concentrated by evaporation to about 80 per cent or 85 per cent to obtain a palatable, edible sweet syrup suitable for use in any manner in which syrup is generally employed, or it may be concentrated to 90 per cent or more and treated as previously described to obtain crystallin levulose.

I claim:

1. The herein described process consisting essentially of clarifying the juice of inulin-bearing plants to form a mixture of inulin and other carbohydrates in solution, hydrolyzing the carbohydrates to convert them into levulose, adding a ferment to the solution and fermenting to remove protein impurities.

2. The herein described process consisting essentially of clarifying the juice of inulin-bearing plants to form a mixture of inulin and other carbohydrates in solution, hydrolyzing the carbohydrates to convert them into levulose, adding pepsin to the solution and fermenting it to remove protein impurities.

3. The herein described process consisting essentially of separating the juice of inulin-bearing plants from the vegetable matter, adding sufficient acid thereto to hydrolyze the inulin and other carbohydrates contained therein and form levulose, fermenting the juice to remove impurities, and separating the levulose therefrom.

In testimony whereof I affix my signature.

WILLIAM C. ARSEM.